United States Patent [19]

Nakadate et al.

[11] Patent Number: 4,699,744
[45] Date of Patent: Oct. 13, 1987

[54] METHOD OF MANUFACTURING A PHOTOGRAPHIC REFLECTING SUPPORT

[75] Inventors: Takanori Nakadate; Kazuto Kiyohara; Ichiya Harada, all of Hino, Japan

[73] Assignee: Konishiroku Photo Industry Co., Ltd., Tokyo, Japan

[21] Appl. No.: 828,056

[22] Filed: Feb. 10, 1986

[30] Foreign Application Priority Data

Feb. 12, 1985 [JP] Japan .................................. 60-25792

[51] Int. Cl.$^4$ ...................... B29B 13/02; B29C 47/36
[52] U.S. Cl. ............................. 264/101; 264/210.6; 264/235.8; 264/290.2; 264/345; 264/DIG. 69
[58] Field of Search ................. 264/210.1, 210.6, 211, 264/85, 235.6, 235.8, 290.2, 345, DIG. 69, 346, 101, 102

[56] References Cited

U.S. PATENT DOCUMENTS

| | | | |
|---|---|---|---|
| 3,154,461 | 10/1964 | Johnson | 264/210.1 |
| 3,201,506 | 8/1965 | Bills | 264/210.6 |
| 3,627,625 | 12/1971 | Jarrett | 264/290.2 |
| 3,720,732 | 3/1973 | Sevenich | 264/210.6 |
| 3,753,661 | 8/1973 | Simons | 264/85 |
| 3,804,937 | 4/1974 | Morris et al. | 264/210.1 |
| 3,903,234 | 9/1975 | Ikeda et al. | 264/210.6 |
| 3,944,699 | 3/1976 | Mathews et al. | 264/235.8 |
| 3,980,748 | 9/1976 | Okuyama et al. | 264/235.6 |
| 4,409,167 | 10/1983 | Kolouch et al. | 264/102 |
| 4,569,885 | 2/1986 | Yamaguchi et al. | 264/346 |

FOREIGN PATENT DOCUMENTS

| | | | |
|---|---|---|---|
| 50-36461 | 11/1975 | Japan | 264/85 |
| 53-71162 | 6/1978 | Japan | 264/101 |
| 57-07048 | 2/1982 | Japan | 264/211 |
| 57-109948 | 7/1982 | Japan | 264/211 |

*Primary Examiner*—Jeffery Thurlow
*Attorney, Agent, or Firm*—Jordan B. Bierman

[57] ABSTRACT

A method of manufacturing a photographic reflecting support wherein chips and/or resin scraps of a thermoplastic resin are heat-treated in a vacuum and fed into an extruder to be melted and then extruded in the form of a sheet out of the die of the extruder. The resulting sheet is then cooled and solidified on a cooled casting drum and stretched 6 to 16 times in terms of area, lengthwise and then widthwise or vice versa, or biaxially at the same time, at a temperature within the range of from a temperature not lower than the glass transition point of the thermoplastic resin to a temperature not higher than 150° C. The stretched sheet is then thermoset at a temperature within the range of from a temperature not lower than 170° C. to a temperature of the melting point of the thermoplastic resin and the resulting photographic reflecting support is made from 40 μm to 300 μm in thickness and not higher than 20% in visible-wave-length range transmittance.

10 Claims, No Drawings

METHOD OF MANUFACTURING A PHOTOGRAPHIC REFLECTING SUPPORT

BACKGROUND OF THE INVENTION

This invention relates to a method of manufacturing a photographic reflecting support. Herein, the photographic reflecting support means a support for a photographic material, which is so-called a photographic printing paper, capable of serving to directly observing a photographic image with reflected light.

Heretofore, as conventional supports of reflecting photographic materials, a polyethylene-coated paper has generally been used and to which a polyethylene layer having been prepared by blending with a white pigment or the like has been provided on the base paper made of pulp. However, the use of such polyethylene-coated paper has usually impaired the brightness, sharpness and consequent overall beauties of the resulting photographic image because of its rough and wavy glossy surface caused by the uneven surface of the original paper. Furthermore, since such base paper is covered with water-impermeable polyethylene film on both surfaces but not on cut sections, such processing solutions as a developer and the like possibly intrude through these sections into the entity of paper, and its possible migration to photographic layers during aging causes seriously adverse effects to the photographic image.

As means to resolve such problems of conventional supporting material, some techniques have been proposed with use of only a thermoplastic film instead of the base paper.

For example, certain techniques to fill polystyrene film with white pigment have been disclosed in Japanese Patent O.P.I. Publication No. 114921/1974, and Japanese Patent Examined Publication No. 5104/1980, but such a film still has a drawback to be hard and brittle. From the viewpoint of physical properties such as the mechanical strength of film, such polyester resins as polyethylene terephthalate appear to be better to use; accordingly, techniques to use polyester resins also have been disclosed, for example, in British Patent Nos. 1,563,591 and 1,563,592, in which the material of polyester resin was blended with barium sulfate, and then stretched; furthermore, in Japanese Patent Examined Publication No. 4901/1981, a technique was disclosed with the combination use of barium sulfate and titanium oxide.

In order to use a film made from polyester resin as a photographic reflecting support, its whole visible range transmittance is necessary to be not more than 20%, and its thickness is desirable to be 40 to 300 μm. A support which meets such conditions may be generally manufactured in processes including melting, extruded through a slit die, and quenched with a rotating drum and biaxially stretching of thermoplastic resin mainly composed of polyester resin which contains not less than 10 weight % of dispersed white inorganic pigment. However, sheet materials which are made by melting, extruding and cooling of the thermoplastic resin containing such a large amount of white inorganic pigment is too brittle to be submitted to a steady stretching process without frequent ruptures, to obtain a film with a sufficient toughness. Although, as a biaxially stretching process, the means to monoaxially stretch the material lengthwise and then widthwise or in the converse order may be generally advantageous in the viewpoint of production cost, it has a serious drawback that the material is readily ruptured particularly on the second, transverse stretching step, and thus it is unsuitable for securing a long sized supporting product. Some techniques of simultaneously biaxial stretching also have a similar drawback of rupture.

The invention has been made to resolve the above drawback, and its object is therefore to present a steady manufacturing method of a photographic reflecting support with a sufficient strength, which is composed of thermoplastic resin that mainly comprises polyester resin and contains not less than 10 weight % of dispersed white inorganic pigment.

SUMMARY OF THE INVENTION

The above object of the invention is attained by the manufacturing method of a photographic reflecting support with a thickness of 40 to 300 μm and a not more than 20% transmittance for the whole visible range, which is obtained with successive processes which include (1) that chips and/or resin scraps composed of thermoplastic resin which mainly comprises polyester resin and contains not less than 10 weight % of dispersed white inorganic pigment, are heat treated at 180° to 245° C. for not less than 3 hours under a vacuum not more than 20 mmHg, fed into an extruder, melt therein, and outputted through a nozzle in the form of sheet, and (2) that the obtained sheet is cooled and solidified on the surface of a cooled casting drum, and stretched 6 to 16 times in area draw ratio, lengthwise and then widthwise or in the converse order, or simultaneously biaxially, at a temperature between the glass transition point of the thermoplastic resin and 150° C. preferably 130° C., and (3) that the stretched film is heat set at a temperature between 170° C. and the melting point of the thermoplastic resin.

(1) According to the invention, the conventional drawback of rupture is eliminated which occurs in the biaxially stretching process for the manufacture of polyester film which contains a large amount (for example, not less than 10 weight %) of dispersed white inorganic pigment.

(2) The polyester film which is manufactured according to the invention and contains white inorganic pigment, has an improved mechanical strength (resistance to breakage by repeated foldings).

(3) The polyester film manufactured according to the invention has good properties desirable as a photographic reflecting support, such as water impermeability, and chemical resistances during developing processes.

DETAILED DESCRIPTION OF THE INVENTION

The thermoplastic resin used in the invention (hereinafter referred to as the resin of the invention) mainly composed of polyester resin includes not only thermoplastic resins composed of the only polyester, but also those containing, besides polyester, also other polymers and additives (such as optical brightening agents, dyestuffs, ultraviolet absorbers and antistatic agents) in so far as they do not substantially affect the properties of the polyester as the main component.

As polyester resin used in the invention, there are preferred polymers of condensate between an aromatic dicarboxylic acid (such as terephthalic acid, isophthalic acid, phthalic acid, and naphthalene dicarboxylic acid), and a glycolic compound (such as ethylene glycol, 1,3-propanediol, and 1,4-butanediol), for example, polyethylene terephthalate, polyethylene 2,6-dinaphthalate, polypropylene terephthalate and polybutylene terephthalate, and copolymers among from the above condensates; above all other above polymers, polyethylene terephthalate (hereinafter abbreviated to PET) is especially preferred as the resin of the invention.

The resin of the invention has a preferably 0.4 to 0.8, especially 0.5 to 0.7 inherent viscosity which is determined at 20° C. in a mixed solvent of phenol/tetrachloroethane (of weight ratio of 60 to 40).

For white inorganic pigment used in the invention, such materials as titanium oxide, barium sulfate, calcium carbonate, silica, talc, zinc sulfide and clay are suitable, but certain combinations of them are also useful. The white inorganic pigment is preferably not larger than 20 µm, especially not larger than 10 µm in its average particle size. The amount of the white inorganic pigment dispersed into the resin of the invention depends to some extent on the type of pigment, but is essentially at least not less than 10 weight parts and preferably not more than 30 weight parts per 100 weight parts of pigment plus resin. Chips composed of the resin of the invention (hereinafter referred to as the resin composition of the invention) containing not less than 10 weight % of the dispersed white inorganic pigment can be manufactured with varied methods including the method in which the pigment is added to and dispersed into a glycolic compound such as ethylene glycol to form a slurry which is in turn polymerized, and then dried and chipped; and the method in which the pigment is mixed and dispersed, with the use of a Banbury mixer or a twin screw extruder, into the resin of the invention which is then chipped.

The resin scraps aforementioned mean pieces of resin or finely cut resin from the pieces which have been generated through previous manufacturing operations for the photographic reflecting support of the invention or the like but have not been made up to the product.

The chips which are manufactured through the heat treatment of the invention include cubic, strand and other chips which are used in the general art of extrusion molding, without specific limits in their shape and size. The resin scraps are preferably cut in shape and size so as to be readily mixed with the relevant chips when used with the chips, in view of their granular properties such as apparent density and angle of rest.

As aforementioned, the chips and/or resin scraps of the invention are heat treated at 180° to 245° C. for not shorter than 3 hours under a vacuum not more than 20 mmHg; in that case, the vacuum is preferably not more than 10 mmHg, and the heat treatment is carried out preferably for not shorter than 5 hours. When the treating temperature is relatively low, it takes preferably rather long; however, since an excessively long treatment occasionally makes the resin discolored, the treatment time comes preferably within not longer than 48 hours in consideration of the type and content of the pigment to be applied.

The heat treatment can be carried out by heating the wall of the vessel of chips and/or resin scraps with a certain well-known means. The conditions of the heat treatment of the invention should be determined with the temperature inside the wall of the vessel. Even though the temperature of the chips and/or resin scraps depends to some extent on the heat treatment conditions, that immediately after the heat treatment is usually somewhat lower than that inside the wall of the vessel. The heat treatment is preferably carried out under stirring so that the chips and/or scraps may be uniformly heated. The heat treatment of the invention may be commenced also after preheating of the chips and/or resin scraps at a temperature lower than the former.

The heat treated chips and/or resin scraps of the invention are then fed into an extruder, melted therein, and outputted through a nozzle in the form of sheet. The outputted sheet is cooled and solidified on the surface of a cold casting drum to prevent the crystallization of the material as effectively as possible. These processes can be performed according to common ways in the art.

In the interval between the heat treatment and the feeding into the extruder in the above processes, it is desirable either that the chips and/or resin scraps are fed into the extruder immediately after the heat treatment, or that they are kept in an atmosphere of air or inert gas at a temperature of not lower than 100° C. and a relatively low humidity (i.e., a dew point of not higher than 0° C.) for the above interval, so that they may not be rehumidified.

The cooled and solidified semifinished product of the invention can be biaxially stretched and heat set according to common ways in the art. In the support of the invention, the one which has been biaxially stretched stepwise or simultaneously only less than 6 times in area draw ratio could be ruptured on being repeatedly folded or the like. On the other hand, a stretching ratio more than 16 would not only be very difficult as such, but also, even if possible as such, could cause the product to be readily torn up because of an excessively high orientation of molecules along the surface. Thus both the above products stretched excessively low and highly would be unsuitable for the use as photographic reflecting support. The stretching temperature is desirable to be higher than the glass transition point of the resin of the invention by not lower than 5° C. in view of little ruptures on the stretching procedure.

It has been known that, when polyester resin is melted in its moisture-retaining phase, it tends to reduce its polymerization degree because of the hydrolysis of its ester bond, causing the deterioration of the qualities of resulting molded products. It has been known also that, as means to prevent such deterioration, the technique that the material was dried in the form of chip before molding. On the other hand, however, since an excessively high temperature for drying could cause the polyester material to be thermally decomposed, it might be usually that the polyester resin material is dried at around 140° to 170° C. at atmospheric or reduced pressure. When the chips composed of the resin composition of the invention was dried under the above known conditions, melted, extruded, and cooled, and then the obtained sheet was biaxially stretched, it could be stretched at area draw ratios ranging from 2 to 4 times without problems, but the obtained support was insufficient in its mechanical strength. Hence, various attempts to stretch the sheet at different temperatures and/or by different heating means or the like to obtain a support at a higher area draw ratio, they failed to form film steadily because of frequent ruptures on the stretching procedure.

However after elaborate investigations, the inventors found such a surprising fact as follows. That is, a photographic reflecting support of 40 to 300 µm in thickness with not more than 20% of a whole visible range transmittance can be produced steadily without intermittent ruptures with successive processes in which (1) that chips and/or resin scraps composed of the resin composition of the invention are heat treated at 180° to 245° C. for not shorter than 3 hours, preferably for not shorter than 4 hours under a vacuum not more than 20 mmHg, fed into an extruder, melted therein, and outputted through a die in the form of sheet, and (2) that the sheet is cooled and solidified on the surface of a cooled casting drum, and then stretched 6 to 16 times in area draw ratio lengthwise and then widthwise, or in the converse order, or simultaneously biaxially, at a temperature between the glass transition point of the resin of the invention and 150° C. and preferably 130° C., and then (3) that the obtained film is heat set at a temperature between 170° C. and the melting point of the resin of the invention.

The manufacturing method of the invention includes also the method to use a mixture of chips (so-called master chips) which are composed of the resin of the invention that contains a large amount of white inorganic pigment and other chips (so-called virgin chips) which are composed of the resin of the invention that contains no white inorganic pigment. The latter method may be practiced by either that a mixture of the master chips heat-treated according to the invention and the virgin chips dried under usual drying conditions are fed into the extruder, or that the mixture of the master chips and the virgin chips is heat treated according to the invention and then fed into the extruder.

When a mixture of the chips with resin scraps composed of the resin composition of the invention, which have been yielded during previous manufacturing processes of the support of the invention is used, the resin scraps may be either heat treated together with the chips, or separately heat treated and then mixed with the chips heat-treated.

The support of the invention may be submitted to a heat relaxation process after the biaxially stretching and heat setting processes, as needed.

The resin of the invention is allowed to contain other additives than the described white inorganic pigment, which are usually used, such as optical brightening agents, dyestuffs, ultraviolet absorbers and antistatic agents, at any arbitrary and practical stage of process, in so far as they diminish the effects of the invention.

EXAMPLE

In the following Examples of the present invention, the embodiment of the invention will be clarified, but the substantial patterns of the invention shall not be limited thereto.

EXAMPLE 1

One hundred (100) weight parts of PET resin with an intrinsic viscosity of 0.65 was dispersive added with 15 weight parts of anatase-form titanium oxide, which had been surface-treated with alumina and silica and had an average particle size of 0.25 μm, was used to form chips. The chips were heat treated at 220° C. for 10 hours under a 5 mmHg vacuum, fed into an extruder, melted, and outputted through a die in the form of sheet. The obtained sheet was cooled and solidified on the surface of a cooled casting drum, stretched lengthwise by 3 times with drawing rolls at 100° C. and, subsequently, widthwise by 3 times with a tenter at 110° C., and was then heat set at 210° C. for 3 minutes. The obtained film was 125 μm thick and had a whole visible range transmittance of 8% as a reflecting support.

This reflecting support was produced steadily and continuously without intermittent ruptures. It remained unbroken even after a 1000-time repeated folding test which was made under a load of 1.5 kg at 23° C. and 55% RH according to the MIT anti-folding fatigue test method described in "Experimental Polymer Course", vol. 8 (Kyoritsu Publishing Co., 1960), p. 280.

COMPARATIVE EXAMPLE 1

Chips similar to those used in Example 1 were hot-air dried at 170° C. with air with a dew point of 0° C. for 6 hours, and processed under the same conditions as in Example 1. The obtained sheet had no sooner been stretched widthwise after stretched lengthwise than it ruptured, and therefore failed to form a continuous film.

COMPARATIVE EXAMPLE 2

Chips similar to those used in Example 1 were dried at 170° C. for 8 hours under a 5 mmHg vacuum, fed into an extruder, melted, and outputted therefrom. The obtained sheet was cooled and solidified on the surface of a cooled casting drum, stretched at 100° C. lengthwise by 2 times with drawing rolls, and, subsequently, at 110° C. widthwise by 2 times with a tenter, and was then heat set at 210° C. for 3 minutes. The obtained film was 125 μm thick and had a whole visible range transmittance of 8% as a reflecting support. This reflecting support was produced continuously without intermittent ruptures. However, it was broken even by 5-time folding in the same test as in Example 1, and was regarded as useless as a photographic reflecting support.

EXAMPLE 2

One hundred (100) weight parts of chips similar to those used in Example 1, and 30 weight parts of resin scraps which had been obtained by crushing the chips yielded on tenter trimming in Example 1, were mixed together. The mixture was heat treated at 200° C. for 12 hours under a 1 mmHg vacuum, and processed under the same conditions as in Example 1. A film material as a reflecting support 125 μm thick was obtained continuously.

This support remained unbroken even after a 1000-time folding test similar to that in Example 1.

What is claimed is:

1. A method of manufacturing a photographic reflecting support comprising:
   heat-treating chips and/or resin scraps composed of a thermoplastic resin mainly comprising a polyester resin and containing a white inorganic pigment in an amount of not less than 10% by weight, at a temperature of from 180° C. to 245° C. for a period of not shorter than 3 hours in a vacuum of not more than 20 mmHg;
   feeding said heat-treated chips and/or resin scraps into an extruder to be melted and then extruded in the form of a sheet out of the die of the extruder;
   cooling and solidifying the resulting sheet on a cooled casting drum;
   stretching said cooled and solidified sheet 6 to 16 times in terms of area. lengthwise and then widthwise or vice versa, or biaxially at the same time, at a temperature within the range of from a temperature not lower than the glass transition point of said thermoplastic resin to a temperature not higher than 150° C.;

thermosetting said stretched sheet at a temperature within the range of from a temperature not lower than 170° C. to a temperature of the melting point of said thermoplastic resin; and making the resulting photographic reflecting support be from 40 μm to 300 μm in thickness and not higher than 20% in visible-wave-length range transmittance.

2. The method of manufacturing a photographic reflecting support as claimed in claim 1, wherein said temperature of said stretching is within the range of from a temperature not lower than the glass transition point of said resin to not higher than 130° C.

3. The method of manufacturing a photographic reflecting support as claimed in claim 2, wherein said polyester resin is at least one selected from the group consisting of the polymers of the condensation products of such an aromatic dicarboxylic acid as terephthalic acid, isophthalic acid. phthalic acid and naphthalene dicarboxylic acid with such a glycolic compound as ethylene glycol, 1,3-propanediol and 1,4-butanediol; said polymers including the copolymers thereof.

4. The method of manufacturing a photographic reflecting support as claimed in claim 3, wherein said polyester resin is at least one selected from the group consisting of the polymers of polyethylene terephthalate, polyethylene-2,6-dinaphthalate, polypropylene terephthalate, polybutylene terephthalate and copolymers thereof.

5. The method of manufacturing a photographic reflecting support as claimed in claim 2, wherein said polyester resin is from 0.4 to 0.8 in inherent viscosity determined at ° C. in a mixed solvent of phenol and tetrachloroethane in the weight ratio 60:40.

6. The method of manufacturing a photographic reflecting support as claimed in claim 2, wherein said white inorganic pigment is at least one selected from the group consisting of titanium oxide, barium sulfate, calcium carbonate, silica, talc, zinc sulfide and clay.

7. The method of manufacturing a photographic reflecting support as claimed in claim 2, wherein said white inorganic pigment is contained in an amount of within from not less than 10 parts by weight to not more than 30 parts by weight per 100 parts by weight in total of said pigment and said thermoplastic resin.

8. The method of manufacturing a photographic reflecting support as claimed in claim 2, wherein said chips and/or resin scraps are heat-treated for a period of from 5 to 48 hours.

9. The method of manufacturing a photographic reflecting support as claimed in claim 2, wherein said temperature in the stretching process is higher than the temperature of the glass transition point of said thermoplastic resin by not lower than 5° C.

10. The method of manufacturing a photographic reflecting support as claimed in claim 2, wherein said white inorganic pigment is not greater than 20 μm in average particle size.

* * * * *